Nov. 13, 1934.   G. R. BENJAMIN ET AL   1,980,160
PROJECTOR FOR TYPE BAR PRINTERS
Filed March 17, 1931   3 Sheets-Sheet 2

Inventors
G. R. BENJAMIN
J. W. LONG

By their Attorney
Eugene C. Brown

Nov. 13, 1934.                G. R. BENJAMIN ET AL                1,980,160
                            PROJECTOR FOR TYPE BAR PRINTERS
                         Filed March 17, 1931         3 Sheets-Sheet 3

Inventors
G. R. BENJAMIN
J. W. LONG

By their Attorney

Patented Nov. 13, 1934

1,980,160

UNITED STATES PATENT OFFICE 1,980,160

PROJECTOR FOR TYPE BAR PRINTERS

George R. Benjamin, Jersey City, and James W. Long, Plainfield, N. J., assignors to The Western Union Telegraph Company, New York, N. Y., a corporation of New York Application March 17, 1931, Serial No. 523,372

8 Claims. (Cl. 178—24)

This invention relates to a printing telegraph projector and more particularly to a page printing telegraph apparatus and associated projecting mechanism for displaying on a suitable screen, news items and other information, in enlarged characters.

Various arrangements have been proposed heretofore for projecting a continuous or traveling line of information, such as stock quotations, from a tape telegraph printer or ticker, and in all of such systems, as far as we are aware, there is always an appreciable lag, corresponding to a considerable length of tape, between the printing of a character and its appearance on the screen. This is due to the fact that the printing position of the ticker is so located as to require the tape to be moved a considerable distance beyond the printing position in order to bring each printed character into the field of the projector. Obviously, if the transmission is interrupted at any time, the information contained on the tape between the printer and the projector will not appear on the screen until after the transmission is again resumed. It will be apparent moreover that unless an unduly long screen is provided, which is impractical because of projection difficulties, the amount of information which will be visible at any instant is quite limited.

In order to increase the amount of printed matter visible at any instant on a screen of moderate dimensions, it has been proposed to project from the web of a page printing telegraph machine. Such an arrangement is shown in an application to J. W. Long and E. R. Wheeler, filed February 20, 1931, Ser. No. 517,353, entitled "Page projector for recorders." In this latter application, a type wheel printer of the Burry type is employed associated with a projector and so arranged that each line, as it is printed, moves directly from the printing position into the unobstructed field of the projector so as to appear immediately upon the screen. The only lag between printing and projection is that of the line being printed at any instant.

The present invention is in the nature of an improvement on the aforesaid arrangement, one of the objects being to provide a printing telegraph projector of the page or successive line type in which each character, substantially as soon as it is printed, appears in the unobstructed field of the projector.

Another object is to produce a page printing telegraph projector of the typebar class in which any desired number of printed lines may be simultaneously projected and in which there will be substantially no lag between the printing and its appearance on the screen.

Other objects and advantages of the invention will appear from the following detailed description of my invention, reference being had to the accompanying drawings in which Figure 1 is a perspective view of a typebar printer and projector embodying my invention;

Figure 1:
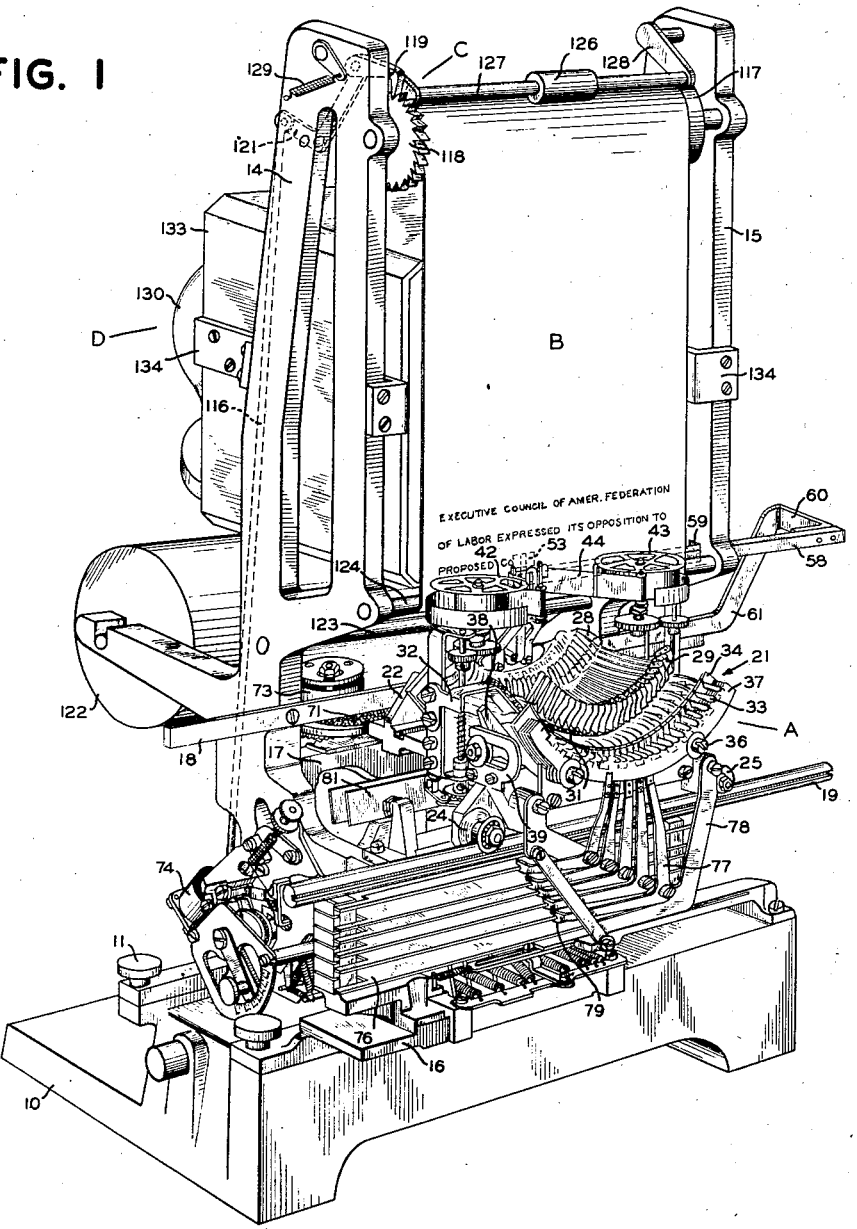

The printing and projecting apparatus comprises the printing mechanism A, a web B of transparent or translucent material, such as specially prepared paper, cellophane, etc., a take-up mechanism C and a projecting system D.

The telegraph printer A is of a type well known in the art under the designation of page typebar printer, Model 15, manufactured by the Teletype Corporation and the disclosure thereof has, therefore, been restricted to so much of the printer as is necessary for an understanding of the principles of operation thereof and to the changes in construction of the machine and the attachments thereto, made in accordance with a preferred embodiment of the invention.

The printing telegraph machine comprises a suitable base 10 upon which the main frame is secured, as by screws 11. The main frame includes two irregularly shaped side plates or castings 14 and 15, a bottom support 16 to which they are secured, and a transverse spacing member 17. A rectangular rail or track 18 and a circular track 19 extend transversely across the front of the frame and serve to support the type carriage assembly 21.

The type carriage assembly includes a casting 22, carrying at the front, spaced flanged carriage supporting rollers 24, 25, riding on track 19, and at its rear a central carriage supporting roller 26, riding upon the rectangular rail 18.

The web B remains stationary during the printing of each line, the type carriage moving along the tracks 18 and 19 transversely of the web.

Secured to the vertical flange 27 of the casting 22 is an arcuate type bar segment 28, in which the bank of type bars 29 are pivoted. At their outer ends the type bars rest on an arcuate pad 31 supported by a bracket 32.

Individual pull bars 33 are disposed immediately below each type bar and rest, at their opposite ends, in slots in the type bar segment 28 and in a comb 34. The comb 34 is secured to the front of the casting 22 and through pins 36 serves to support a group of six notched code bars 37 in a manner so as to enable them to be shifted either to the right or left, in accordance with the received signal impulses, as will be more fully explained hereinafter, so as to line up the notches therein with a single pull bar, to permit the pull bar to drop therein.

The machine is of the start-stop type. Each character group of signals comprising a start signal, six selecting impulses and a stop signal. In order to avoid shifting of the web to effect printing of either upper or lower case characters, a single printing position is employed, a separate type bar being provided for each figure or character. This necessitates the use of a six unit code and the consequent employment of six code bars.

An arcuate pull bar bail 38, mounted in U-shaped guides 39, is disposed below the bank of pull bars and is actuated, first forwardly and then rearwardly, in a manner which will appear later, for each group of character signals transmitted. The code bars having been shifted in accordance with the particular character code combination transmitted, one of the pull bars drops into the path of the bail, which on its forward stroke engages the notch 40 of the pull bar, forcing the same forward and thereby drawing the ratchet teeth 41 of the pull bar against the pinion formed at the end of the type bar, whereby the type bar is thrown upwardly into printing position.

Figure 3:
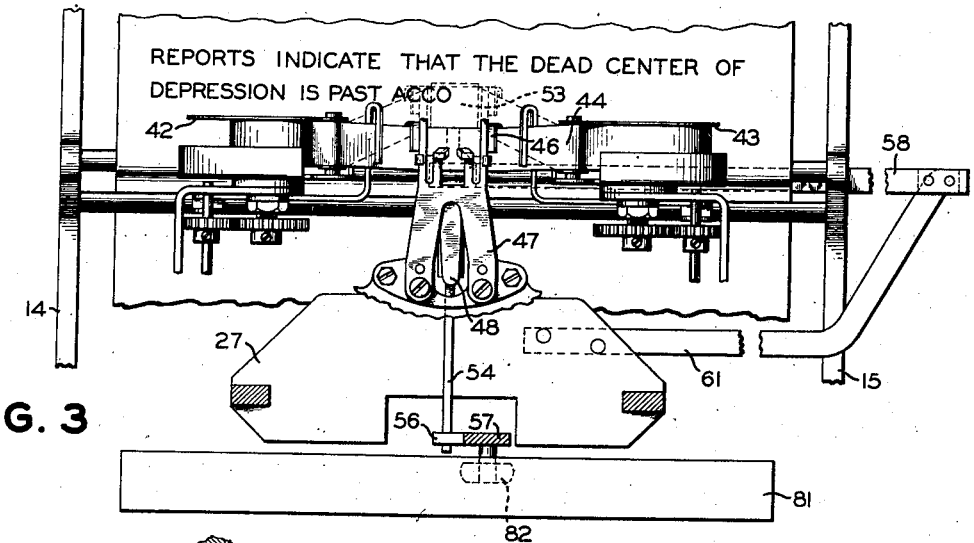
Figure 3 is a front elevation showing the printing position of the machine and the arrangement of the platen with respect thereto.

In the normal operation of type bar printers of this nature, the printing occurs midway between the ribbon spools 42, 43 and below the level of the tops thereof. In accordance with the present invention the structure of the machine has been modified so as to bring the line of printing above the tops of the ribbon spools and into the clear field of the projecting system, as shown in Figure 3, so that each character, as it is printed, can be projected on to a suitable screen. For this purpose the ribbon 44 is normally held below the line of printing by a ribbon guide 46 and is raised to the line of printing as indicated in dotted lines in Figure 3, only during each printing stroke.

The ribbon guide 46 is mounted for vertical sliding movement on a forked support 47, carried by the type bar segment 28, and terminating below the line of printing. A tail piece 48 extends downwardly from the guide 46 and is pivoted at its lower end to a lever 49, which in turn is pivoted to a bracket 50 carried by the rearward extension 51 of the casting 22. A spring 52 coiled about the pivot engages the lever 49 and tends to elevate it so as to raise the ribbon guide and ribbon into printing position in front of the platen 53. A arm 54 depending from the lever 49 is positioned so as to be engaged by a projection 56, on the pull bar bail plunger 57, when it is in its normal or rearward position, thereby normally retaining the ribbon below the line of printing.

Figure 2:
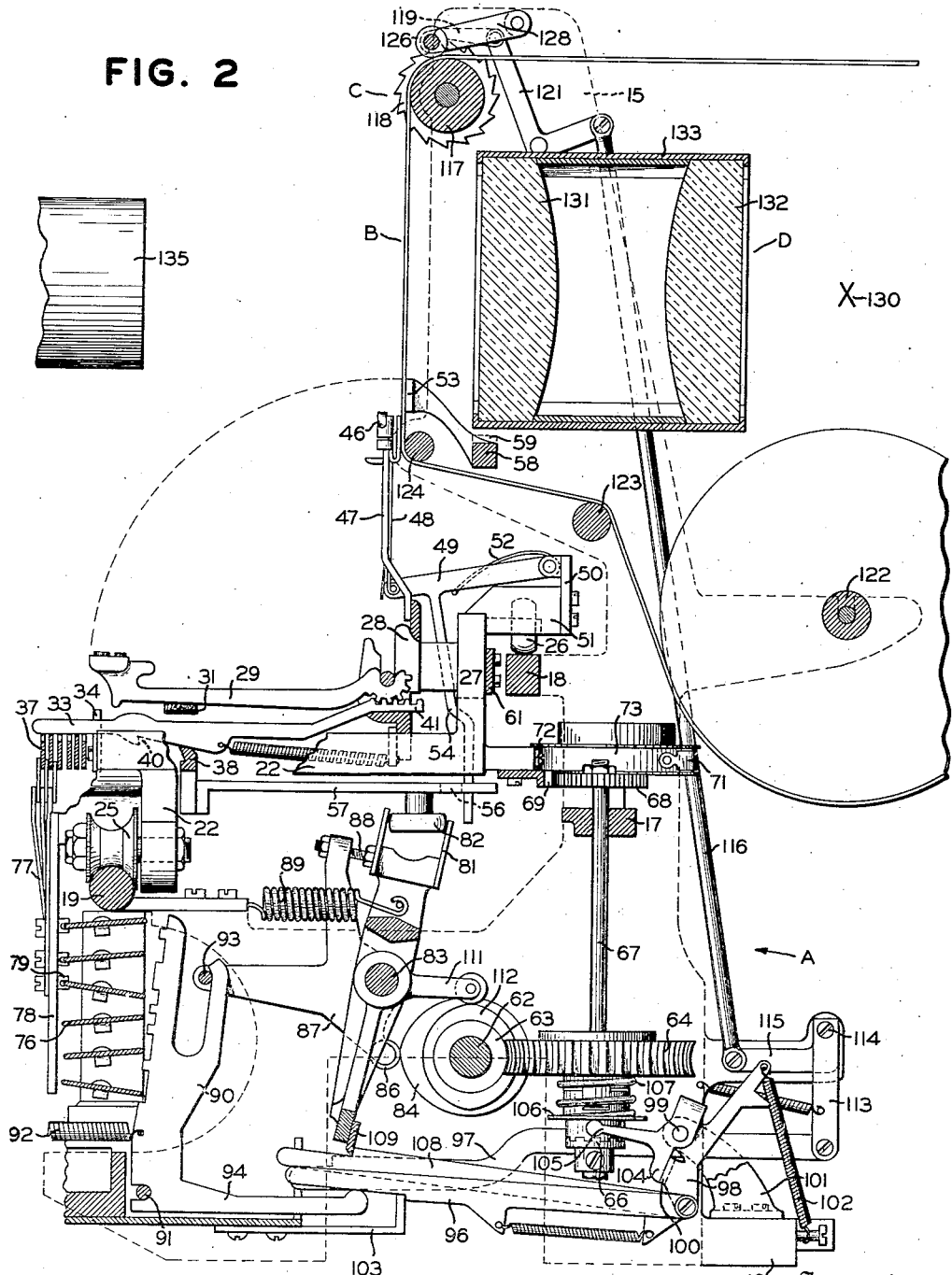
Figure 2 is a vertical sectional view of the printer and projector showing the principal operating mechanism thereof.

The platen 53, in the embodiment shown in Figures 1, 2 and 3 is of a size only slightly greater than the area of the face of the type and is carried by a transverse bar 58, guided in an aperture 59 in the right side plate 15. The bar 58 is secured to an offset bracket 60 fixed to the rear flange 27 of the type carriage, so as to move across the back of the web as the type carriage progresses along the line of printing. The bar 58 and bracket 60 extend around the right side of the web, the lower arm 61 of the bracket passing beneath the web and being secured to the vertical flange 27 of the type bar carriage casting 22.

With this arrangement the only portion of the machine extending into the field of the projector, except at the instant of printing, is the small platen 53 and, as the carriage is spaced to the right, following the printing of each character, the printed character is immediately brought into the clear field of the projector.

The printing and selecting mechanism is driven from a main shaft 62 extending transversely across the rear of the machine. This shaft is driven through a clutch from a continuously running motor not shown. Start-stop mechanism of the usual type may be provided for releasing the shaft 62 for one revolution upon the reception of the start impulse of each signal group.

The shaft has a worm 63 fixed thereto meshing with a gear 64, connected through a clutch 66 with a vertical shaft 67, carrying a small gear 68 at its upper end. The gear 68 meshes with a transversely extending rack 69 supported on the typebar carriage casting 22 and serves to advance the carriage one letter space to the right upon each revolution of the main shaft 62.

A carriage return strap 71 is fastened to the right end of the carriage, at 72 and extends transversely across the back of the machine and around a spring drum 73 mounted at the left side of the main frame, on the transverse spacing member 17. Movement of the carriage to the right is effected against the tension of a spring contained within the drum 73, thus providing the power for returning the carriage to the left margin of the web at the beginning of each new line of printing. The carriage 21 is released for this return movement by disengaging the clutch 66 in a manner to be later explained.

The selecting mechanism which responds to the received code signals is of the usual sword and T-lever type operated under the control of a single line magnet 74 by a series of cams on the main shaft. This form of selector is well known in the art and is fully disclosed in Patent #1,745,633 to Morton et al., granted February 4th, 1930, and, therefore, has not been shown herein. It is sufficient to say that each T-lever is connected to the rear of one of a series of six transverse vanes 76 pivoted at each end at opposite sides of the main frame so as to rock the vanes either upward or downward depending upon whether a spacing impulse or marking impulse is received.

The vanes serve through a series of bell cranks 77 to shift the code bar segments 37, either to the right or left, to select the particular type bar corresponding to the received code signal. The cranks 77 are pivoted on a mounting plate 78 depending from the type carriage and are provided with inwardly turned forked ends 79 arranged to slide along the vanes and to be engaged continuously thereby as the carriage moves across the machine.

The pull bar bail 38, by which each of the pull bars is forced forward, as it drops into the aligned slots of the code bars, is reciprocated by the main printing bail 81, extending transversely of the main frame, through the mediation of a roller 82 depending from the pull bar bail plunger 57. The bail 81 is pivoted on a transverse shaft 83 and is actuated by a cam 84 on the main shaft 62, which cam engages a roller 86 at the end of a lever 87, also pivoted on the shaft 83 and secured to the bail by an adjustable screw 88. The bail is urged forward by a strong spring 89 and is normally held in the rearmost position by the cam 84.

At the completion of the printing of each line, it is necessary to release the clutch 66 to permit the carriage to be returned to its initial or left hand position and to operate the paper feed mechanism to advance the paper upward one line space. These and other auxiliary functions are performed by means of one or more function levers 90, pivoted at 91 behind the vanes 76 and urged forwardly towards the vanes by a spring 92. The levers 90 are notched so that they can rock forward in only one position of the vanes and are normally held out of contact with the vanes by a bail 93 carried by an extension of the lever 87 but are released for movement towards the vanes upon each forward stroke of the printing bail.

The lower end 94 of each of the function levers is extended so as to rest beneath a series of bars, two of which are shown, namely, a carriage return latch bar 96, and the line feed push bar 97.

The carriage return latch bar 96, at its rear end is secured to one arm of a two armed lever 98, pivoted at 99 to a curved bracket or support 101 mounted upon the bottom plate 16. A spring 102 is fastened to one arm of the lever and tends to rock the lever in a clockwise direction, this force being resisted by a latch 103 engaging in a notch in the lower side of the latch bar 96. An offset lug 100 on the lever 98 engages behind the lower arm of a lever 104 also pivoted at 99 and having a substantially horizontal forked arm 105 engaging below the flange 106, of the upper or driven member of the clutch 66. A spring 107 normally holds the clutch engaged but is of such strength as to be overpowered by the spring 102, to effect disengagement of the clutch whenever the latch bar 96 is released from the latch 103. This occurs whenever the vanes 76 are set up in such position as to permit the function lever 90 to rock forward so as to raise the function lever extension 94 to elevate the latch bar 96 above the latch 103. The disengagement of clutch 66 enables the carriage to be returned to the begining of the line by the spring drum 73 and strap 71.

A reset bar 108 is also secured to the lever 98 and extends substantially parallel to the latch bar 96. The bar 108 is notched at its upper side and when moved forward by the spring 102, on release of the latch bar, is arranged to be engaged by a function bail 109 pivoted on the shaft 83 and having an offset arm 111 carrying a roller 110. The roller 110 is arranged to be engaged by a cam 112, on the main shaft 62, twice each revolution of the shaft, so as to oscillate the bail 109 both during the forward stroke of the printing bail and during the rearward stroke thereof. The rearward stroke of the function bail 109, which occurs after the withdrawal of the function lever from the vanes 76, brings the bail into engagement with the notch of the reset bar 108, forcing the bar towards the rear until the latch bar 96, which moves with it, re-engages the latch 103, thereby again locking the clutch 66 in engagement.

The paper feed is obtained by the selection of a second function lever, which may be notched the same as the carriage return function lever 90, in which case the carriage return and line feed will be effected simultaneously. The paper feed function lever, when selected, is arranged to engage beneath the line feed push bar 97 and lift the same into the path of the function bail 109. On the first stroke of the function bail, which occurs before the withdrawal of the function lever from the vanes 76, the bail engages a shoulder on the push bar 97 and forces it rearwardly. The push bar is pivoted to one arm of an inverted U-shaped lever 113, pivoted to the frame at 114. The other arm has a forward extension 115, forming a crank, to the end of which a link 116 is pivoted. The link 116 extends upwardly to the paper feed roller 117 journaled in the side frames 14 and 15. A ratchet wheel 118, fixed to the feed roller, is engaged by a pawl 119, pivoted to one arm of a bell crank 121, the opposite arm of which is connected to the upper end of the link 116. The web passes from a roller 122, mounted at the rear of the machine, below the line of printing, and extends around rollers 123 and 124 and thence vertically upward past the platen 53 and around the feed roller 117. A pressure roller 126, carried on a shaft 127, journaled in arms 128, pivoted to the side frames 14 and 15, holds the web in contact with the feed roller centrally thereof, under the force of spring 129.

The projecting system comprises a suitable light source 130, such as a concentrated filament incandescent lamp, a condensing lens series consisting of a pair of plano-convex lenses 131 and 132 contained within a lens holder 133 secured to the side plates 14 and 15 in any suitable manner, as by means of brackets 134. A water cell may be provided between the lenses 131 and 132 if desired. The lenses are substantially co-extensive with the area of the web B to be projected and serve to direct the light uniformly over the surface of the web. Obviously, in place of transmitting the light through the web, the printing may be projected by reflection from the web, in which case an opaque material would be employed therefor.

Located at the opposite side of the web from the condensing lens system and at the proper focal length therefrom is an objective lens series 135, of any suitable type, for projecting the image upon a suitable screen. The printing and projecting apparatus may be disposed in the base of a cabinet or other container and the image reflected by suitable mirrors upon a screen forming a front wall of the casing, as fully shown in the aforesaid application of Long and Wheeler, or if desired the image may be projected directly upon a screen disposed opposite the projecting lens system 135.

Figure 4:
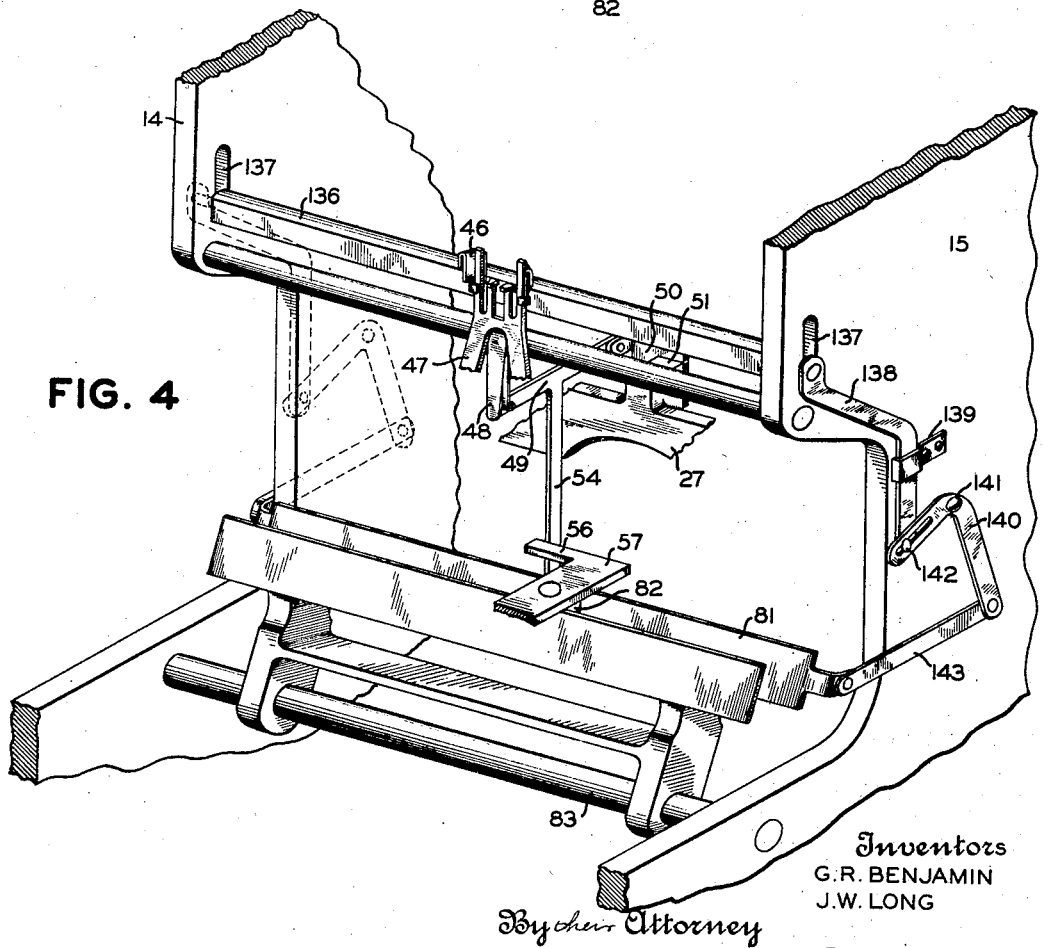
Figure 4 is a perspective view of the operating parts of a modified form of platen.

In Figure 4 I have shown a modified arrangement of the platen operating mechanism. In this form the platen comprises a bar 136 extending transversely across the machine behind the web. The bar 136 is flattened on its forward side to provide a striking surface for the type bars. It is mounted in aligned vertical slots 137 in the side plates 14 and 15 and is normally retained in its lower position below the line of printing. It is connected through suitable linkage so as to be thrown upwardly to the line of printing at the time of completing each printing stroke. A link 138 is secured at each end of the platen and is guided in a suitable guide 139 for vertical movement imparted by a bell crank lever 140, pivoted at 141 to the side plate and having a pin and slot connection 142 to the lower end of the link 138. The opposite arm of the bell crank is connected by a link 143 with the main printing bail 81.

From an inspection of Figure 4 it will be obvious that as the printing bail is thrown forward to elevate one of the type bars the platen 136 and the ribbon guide 46 will be thrown upwardly, simultaneously, to the level of the line of printing. This movement is very rapid, taking place in a fractional part of a second under normal operation so that, due to persistency of vision, there is substantially no interruption in the projection of the printed part of the line as the platen comes upward into the field of the projector. During inactive periods of the printer, the platen and ribbon mechanism are in their lowered position so that the entire field of the projector, including the last character printed, is unobstructed.

It is obvious that the forms of platen shown in Figures 3 and 4 may be readily combined so as to cause the small platen 53 to be normally retained below the line of printing and to be moved both upwardly into the line of printing and transversely of the web on each printing stroke.

Inasmuch as each character appears on the screen as soon as the printing of a line is completed, there is substantially no lag between printing and projection and, therefore, if the transmission is interrupted at any time there will be no unprojected matter on the paper or web.

This apparatus is particularly suitable to printing continuous news service in various places, such as brokers' offices, hotels, restaurants, etc., and may be operated either locally or it may form one unit of an extensive news distributing system having a common transmitting point or station. Machines of the type hereindescribed are capable of high speed operation at a rate of 300 characters per minute or more and, therefore, provide a means of disseminating information to a large group of individuals at a high rate of speed and without inherent delays due to the operating mechanism.

Obviously, numerous changes and modifications may be made in the apparatus disclosed and various forms of printing and projecting apparatus employed without departing from the invention and I contemplate all such modifications and changes as come within the scope of the appended claims.

What we claim is:

1. In a telegraph printing mechanism a type carrier, a platen, a web, operating mechanism for effecting printing transversely of the web and for advancing the web past the printing position, a light source disposed to the rear of said web, said parts and mechanism being so disposed and the platen being so movable after printing of each character that each character, as it is printed, is positioned in a zone which is free from light obstructing parts of the printing mechanism in a plane substantially normal to the web.

2. In combination, a telegraph page printing machine having a web, said web having its printing position outside the confines of the printer, a light source disposed to the rear of said web in position to illuminate said printing position, a type carrier, platen and an inking ribbon therefor, said type carrier, platen and inking ribbon being normally disposed to one side of the line of printing on said web and means for moving said type carrier, platen and inking ribbon into the printing position of the web to print a character on an illuminated portion of said web.

3. In combination, a telegraph page printing machine having a web, a type carrier and a platen therefor, said type carrier and platen being normally disposed to one side of the line of printing on the web and means for moving said type carrier and platen into the line of printing to print a character on said web.

4. In combination, a telegraph page printing machine having a web, a type carrier, inking ribbon and platen all normally disposed to one side of the line of printing on the web and means for moving the same into the line of printing substantially simultaneously to print a character on said web.

5. In combination, a page printing machine having a web, a type carrier adapted to print on the web, a platen and means for moving said platen and type carrier free of each character after printing, to leave the printed character free from obstructing parts of the printer in a plane substantially normal to the web.

6. In combination, a page printing machine having a web, a type carrier, means for moving said type carrier transversely of the web to print successive characters thereon, a platen having an area commensurate with the area of each printed character and means for moving said platen transversely of the web in step with said type carrier so as to leave each printed character exposed at both sides of the web in a plane substantially normal to the web.

7. In combination, a page printing mechanism having a web, a type carrier, means for moving said type carrier transversely of said web to print successive characters thereon, a platen having an area commensurate with the area of each printed character, a support for said platen disposed out of the line of printing and serving to shift the platen transversely of the web in step with said type carrier so as to expose each character, after printing, in a plane substantially normal to the web.

8. In combination, a web, a printing mechanism for printing transversely of said web, a platen normally disposed out of the line of printing and means for momentarily shifting the platen to the line of printing during each printing operation.

GEORGE R. BENJAMIN.
JAMES W. LONG.